United States Patent
White

(10) Patent No.: US 9,338,949 B2
(45) Date of Patent: May 17, 2016

(54) SELF TRIMMING POP-UP SPRINKLER HEAD

(71) Applicant: Michael James White, Roanoke, TX (US)

(72) Inventor: Michael James White, Roanoke, TX (US)

(*) Notice: Subject to any disclaimer, the term of this patent is extended or adjusted under 35 U.S.C. 154(b) by 607 days.

(21) Appl. No.: 13/732,970

(22) Filed: Jan. 2, 2013

(65) Prior Publication Data

US 2013/0168466 A1 Jul. 4, 2013

Related U.S. Application Data

(60) Provisional application No. 61/582,445, filed on Jan. 2, 2012.

(51) Int. Cl.
*B05B 15/10* (2006.01)
*B05B 3/00* (2006.01)
*A01G 25/00* (2006.01)
*A01G 3/00* (2006.01)
*B05B 15/00* (2006.01)

(52) U.S. Cl.
CPC *A01G 25/00* (2013.01); *A01G 3/00* (2013.01); *B05B 15/10* (2013.01); *B05B 15/008* (2013.01)

(58) Field of Classification Search
CPC .......... A01G 25/00; A01G 3/00; B05B 15/10; B05B 15/008
USPC .......... 239/205, 203, 204, 200, 201, 202, 206
See application file for complete search history.

(56) References Cited

U.S. PATENT DOCUMENTS

| | | | | |
|---|---|---|---|---|
| 4,729,511 A * | 3/1988 | Citron | ............. | B05B 15/10 239/205 |
| 4,781,327 A * | 11/1988 | Lawson | ............. | B05B 15/10 239/203 |
| 5,004,157 A * | 4/1991 | Martell | ............. | B05B 15/10 239/205 |
| 5,335,857 A * | 8/1994 | Hagon | ............. | B05B 15/10 239/204 |
| 5,779,148 A * | 7/1998 | Saarem | ............. | B05B 1/3006 239/104 |
| 6,619,570 B1 * | 9/2003 | Ericksen | ............. | B05B 15/068 239/532 |
| 6,629,648 B1 * | 10/2003 | Jones | ............. | B05B 15/10 239/200 |
| 6,971,588 B1 * | 12/2005 | Tarr | ............. | B05B 3/0422 239/204 |
| 7,500,620 B2 * | 3/2009 | Cordua | ............. | B05B 15/10 239/203 |
| 7,823,804 B2 * | 11/2010 | Cordua | ............. | B05B 15/10 239/203 |
| 8,136,742 B2 * | 3/2012 | Cordua | ............. | B05B 15/10 239/203 |
| 2009/0140074 A1 * | 6/2009 | Cordua | ............. | B05B 15/10 239/205 |
| 2011/0036925 A1 * | 2/2011 | Cordua | ............. | B05B 15/10 239/205 |

\* cited by examiner

*Primary Examiner* — Len Tran
*Assistant Examiner* — Steven M Cernoch

(57) ABSTRACT

A self trimming pop-up sprinkler head that is able to cut/trim vegetation or herbaceous material that is negatively impacting the functionality of said sprinkler head. The self trimming pop-up sprinkler head comprises a main body, a trimming mechanism, and a piston assembly. The main body functions as the enclosure that receives pressurized fluid. The piston assembly functions as the telescoping/extendable component that is activated by the pressurized fluid. The trimming mechanism is the integrated component that is operatively coupled to the piston assembly and the main body. Through the operative coupling of said components, the trimming mechanism is able to cut/sever vegetation as well as herbaceous material through the ascending and descending actions of the pop-sprinkler. The trimming mechanism accomplishes this through the use of a pair of cleaver assemblies containing a scissionable alignment that cuts/severs vegetation or herbaceous material that intersects said alignment.

16 Claims, 11 Drawing Sheets

SELF TRIMMING POP-UP SPRINKLER HEAD

The current application claims a priority to the U.S. Provisional Patent application Ser. No. 61/582,445 filed on Jan. 2, 2012.

FIELD OF THE INVENTION

The present invention relates generally to an irrigation apparatus, more particularly to a pop-up sprinkler head with an integrated trimming mechanism provided as a means to remove herbaceous matter that can deflect or inhibits proper irrigation of the pop-up sprinkler head's intended area of use.

BACKGROUND OF THE INVENTION

Irrigation systems are utilized in agricultural, commercial, and residential settings as a means of irrigating areas of vegetation that include but are not limited to crop fields, golf courses, and residential lawns. Traditionally these irrigation systems utilize sprinkler heads as a fluid distribution mechanism in arid or draught prone climates. These sprinkler heads are provided in a plurality of configurations that include but are not limited to impact sprinkler heads, oscillating sprinkler heads, drip sprinkler heads, and pop-up sprinkler heads. Of these configurations, the pop-up sprinkler heads are the most commonly utilized in large scale non-agricultural settings.

Pop-up sprinklers are commonly manufactured in heights from two to twelve inches. Conventionally retractable sprinklers comprise a cap, a main body, a piston assembly, and a nozzle assembly. The cap functions as the upper portion of the main body through which the piston and the nozzle assembly traverse through. The main body functions as the enclosure that receives pressurized fluid as a means to operatively activate the piston assembly and the nozzle assembly. The piston assembly functions as the telescoping/extendable component that is operatively activated by the pressurized fluid received from the main body. The nozzle assembly functions as the fluid distribution mechanism. Commonly the main body is positioned beneath the ground and is connected to a pressurized fluid distribution network.

An advantage of pop-up sprinkler over permanently upright sprinkler heads such as impact sprinklers head, oscillating sprinklers head, and drip sprinklers is that the pop-up sprinkler heads remain below ground until they are activated by water pressure from a pressurized fluid source. When activated the pop-up sprinkler head is pushed above ground level and distributes water to the surrounding vegetation as long as the water pressure remains constant. When water pressure decreases, the pop-up sprinkler heads return to their resting position below ground. By remaining underground until activated, the pop-up sprinkler heads are able to avoid being damaged by, as well as interfering with users, lawn mowers, or wildlife, providing an aesthetic and practical irrigation solution. While pop-up sprinkler heads provide an effective and concealable fluid distribution mechanism, the design is susceptible to unintended interactions from the proximally positioned vegetation.

One such interaction occurs when the runners, lateral branches of certain grasses that traverse along the surface of the soil, grow over the piston assembly. These runners can grow very dense and in some cases are able to prevent the piston assembly from properly deploying. This unintended interaction prevents the pop-up sprinkler head from accomplishing its primary function of irrigating an area. Another situation occurs when the water pressure is turned off and the pop-up sprinkler begins to return to their resting position. During this instance proximally located vegetation may interferes with the piston assembly, preventing the pop-up sprinkler from returning underground. This situation negates the purpose of the pop-up sprinkler head, reducing their aesthetic and practical functionality, as well as potentially increasing the likelihood of being damaged by or damaging users, lawn movers, or wildlife.

It is therefore the object of the present invention to provide a self trimming pop-up sprinkler head that is able to cut/trim vegetation or herbaceous material that is negatively impacting the functionality of said sprinkler head. The present invention accomplishes this through the use of an integrated trimming mechanism that is operatively coupled to the piston assembly and the main body of the pop-up sprinkler. The trimming mechanism is able to cut/sever vegetation as well as herbaceous material through the ascending and descending actions of the pop-sprinkler. The trimming mechanism accomplishes this through the use of a pair of cleaver assemblies containing a scissionable alignment that cuts/sever vegetation or herbaceous material that intersects said alignment.

BRIEF DESCRIPTIONS OF THE DRAWINGS

DETAIL DESCRIPTIONS OF THE INVENTION

All illustrations of the drawings are for the purpose of describing selected versions of the present invention and are not intended to limit the scope of the present invention.

Figure 2:
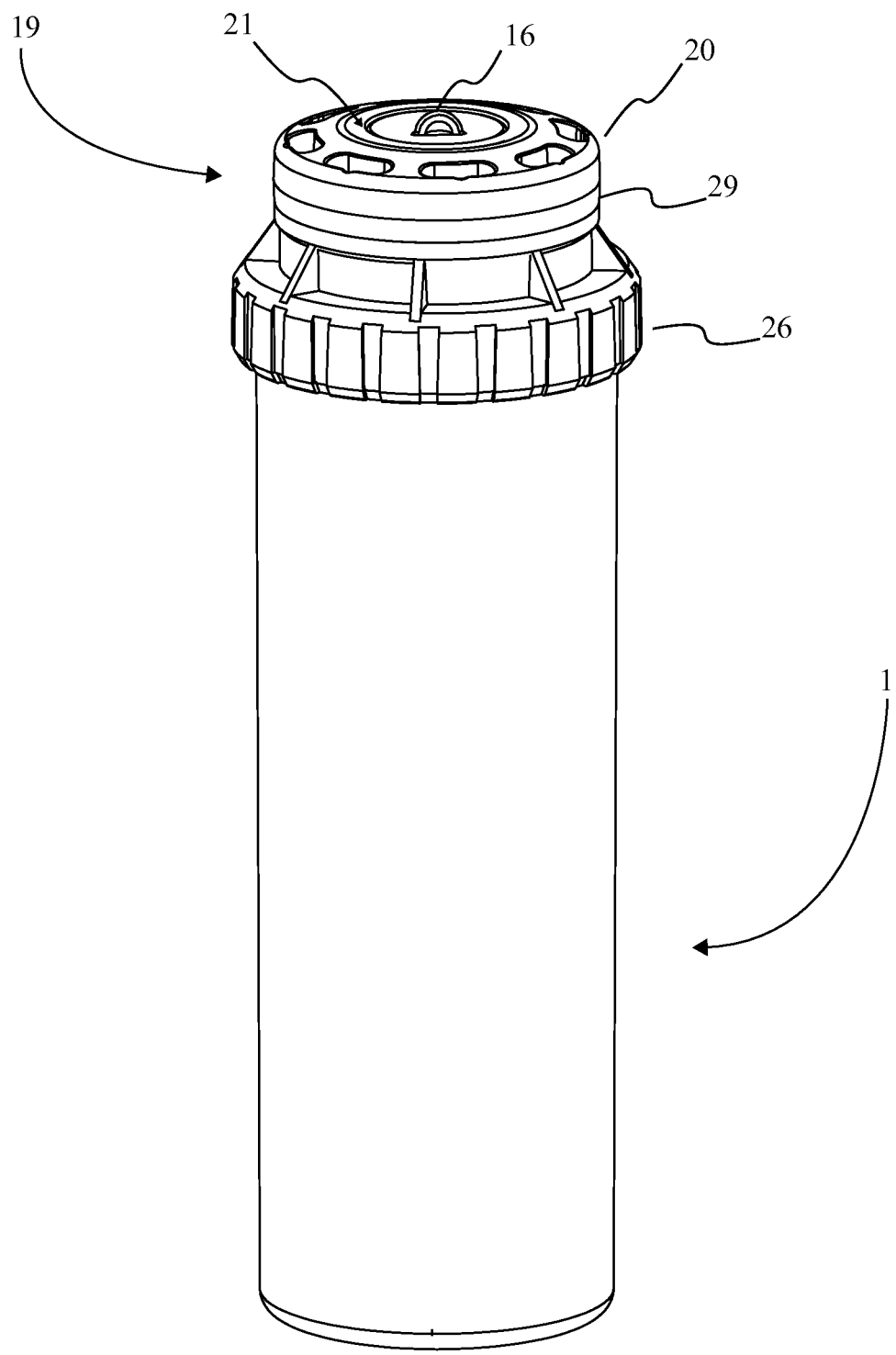
FIG. 2 is a frontal perspective view displaying the positioning of the piston assembly, the main body, and the trimming mechanism in the collapsed/retracted phase of the extending configuration of the present invention.
Figure 8:
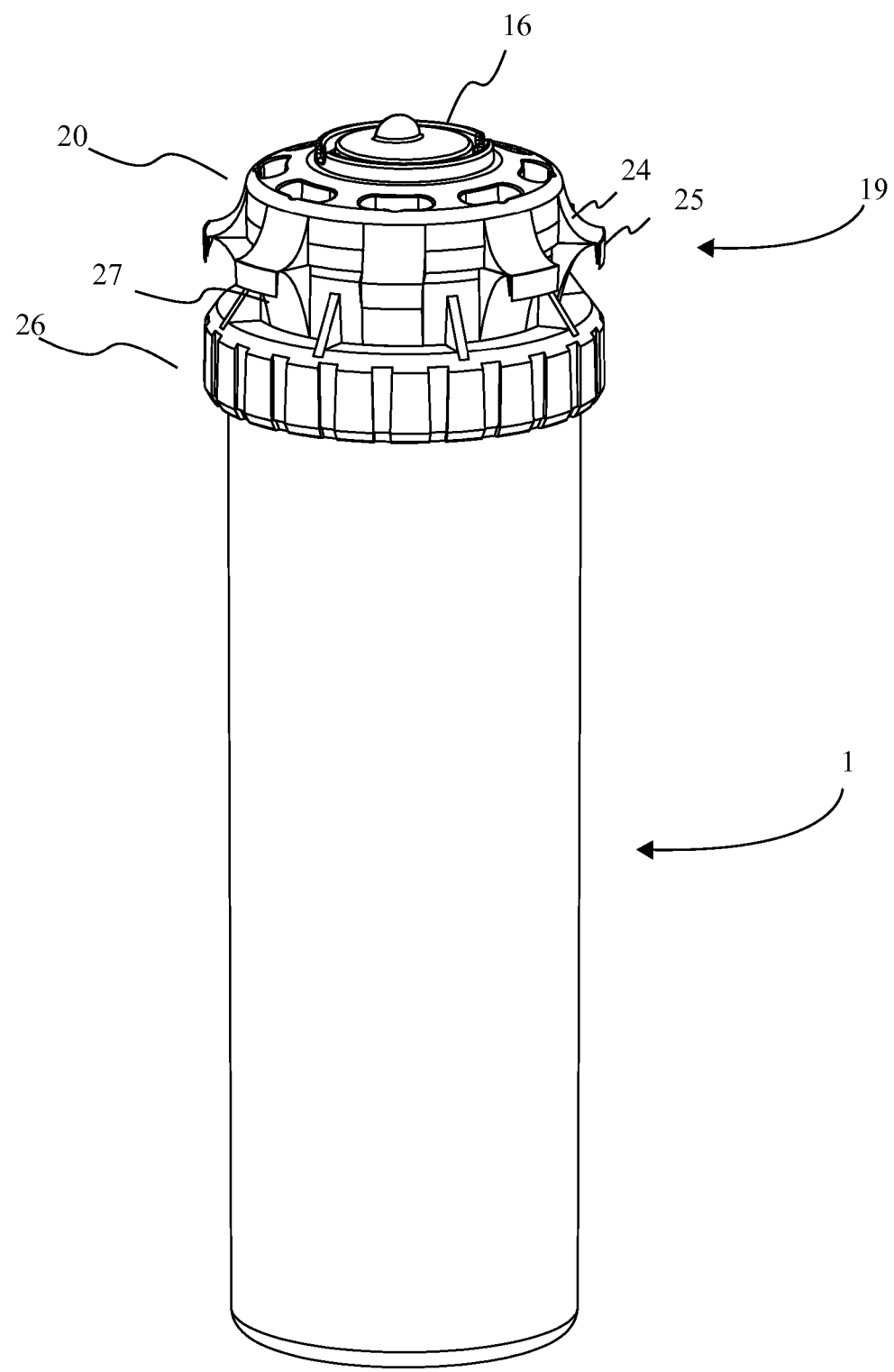
FIG. 8 is a frontal perspective view displaying the positioning of the piston assembly, the main body, and the trimming mechanism in the telescoping/extended phase of the rotating configuration of the present invention.

Referencing FIG. 2 and FIG. 8, the present invention is a self trimming pop-up sprinkler head that is designed to utilize the telescoping/extendable action of a conventional retractable sprinkler for the purposes of removing herbaceous matter from interfering with the functionality of the pop-up sprinkler head. The present invention accomplishes this through the use of a trimming mechanism 19 integrated into a conventional pop-up sprinkler head that is able to sever vegetation found proximally positioned to the pop-up sprinkler. The self trimming pop-up sprinkler head comprises a main body 1, a piston assembly 4, and a trimming mechanism 19. The main body 1 functions as the enclosure that receives pressurized fluid as a means to operatively activate the components involved in the telescoping/extendable action of the present invention. The piston assembly 4 functions as the telescoping/extendable component that is operatively activated by the pressurized fluid received from the main body 1. The trimming mechanism 19 functions as an integrated mechanism that is provided as a means to remove interfering obstructing vegetation proximally positioned to main body 1 and the piston assembly 4.

Figure 6:
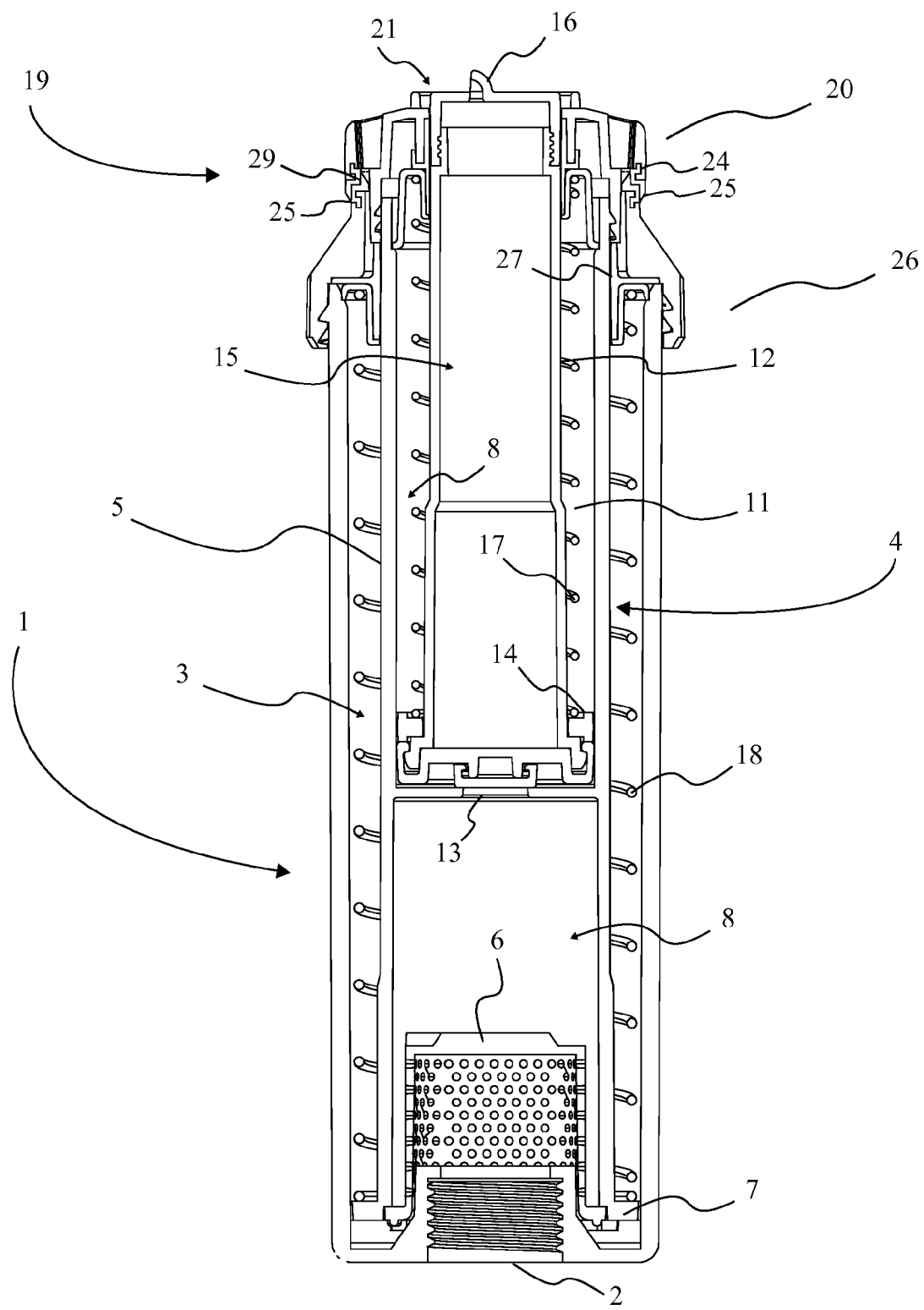
FIG. 6 is a sectional view displaying the positioning of the main body, and the trimming mechanism in the collapsed/retracted phase of the extending configuration of the present invention.
Figure 10:
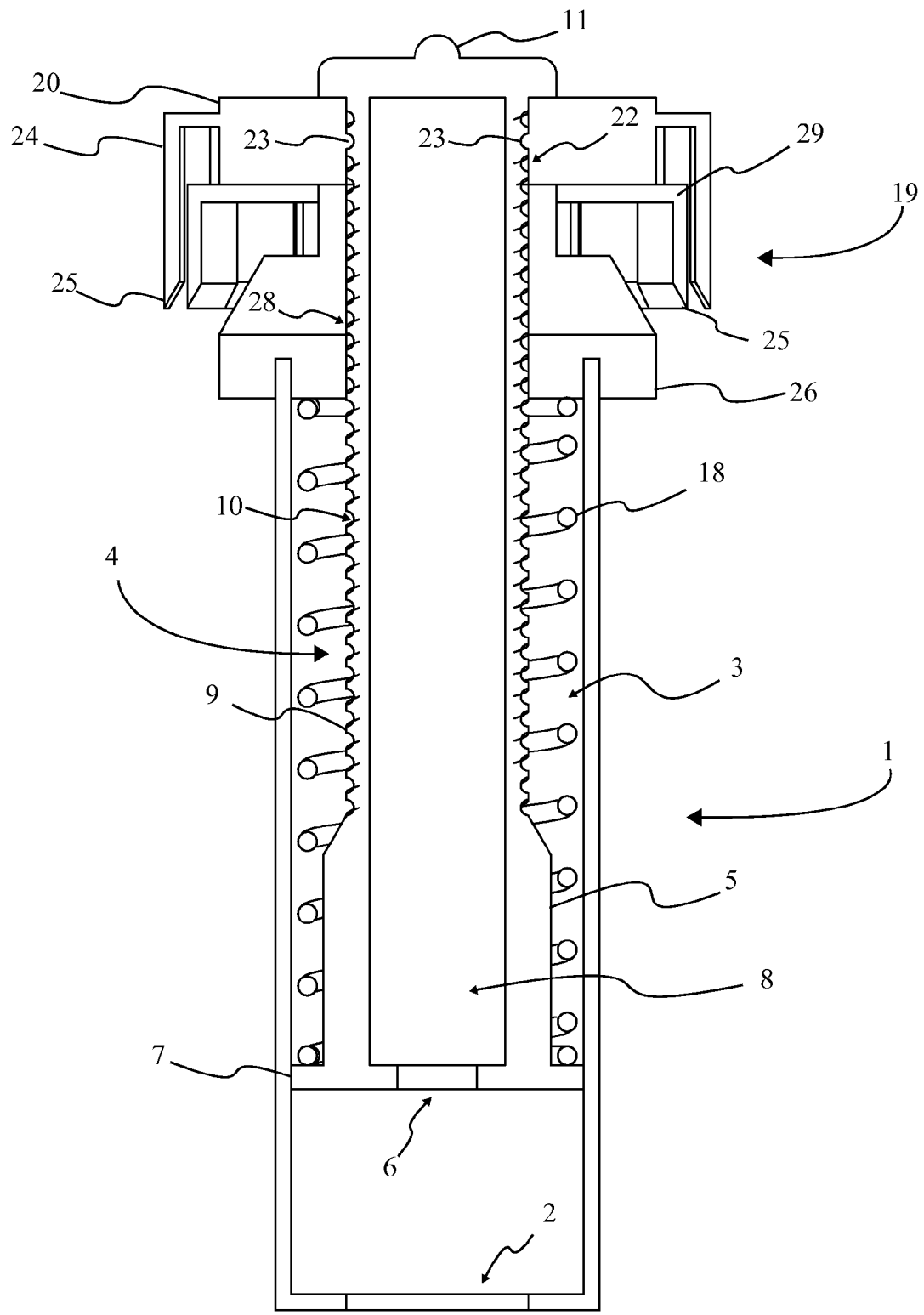
FIG. 10 is a sectional view displaying the positioning of the main body, and the trimming mechanism in the collapsed/retracted phase of the rotating configuration of the present invention.

Referencing FIG. 6 and FIG. 10, the main body 1 functions as the enclosure that receives pressurized fluid needed to operatively activate the piston assembly 4 and the trimming mechanism 19. The main body 1 comprises a main fluid inlet 2 and a main fluid chamber 3. The main fluid inlet 2 functions as an opening for and a connection method to a source of pressurized fluid. The main fluid chamber 3 is the internal cavity within the main body 1 that receives pressurized fluid for operational activity. The main fluid inlet 2 traverses into the main fluid chamber 3, wherein the main fluid inlet 2 and the main fluid chamber 3 are in fluid communication when the main fluid inlet 2 is attached or mounted to a source of pressurized fluid. To utilize the pressurized fluid as the means of activating the piston assembly 4 and the trimming mechanism 19 the main fluid chamber 3 is capped by the trimming mechanism 19 and provides the piston assembly 4 with an extendably positioning within the main fluid chamber 3. The relationship provided allows for the piston assembly 4 to be in fluid communication with the main body 1.

Referencing FIG. 6 and FIG. 10, the trimming mechanism 19 is provided as the integrated component that is able to separate and direct vegetation and herbaceous matter away from the piston assembly 4 as well as cut/trim vegetation that intersects or interferes with the functionality of the pop-up sprinkler head. The trimming mechanism 19 comprises a first cleaver assembly 20 and second cleaver assembly 26. The first cleaver assembly 20 and the second cleaver assembly 26 function as a complementary pair of assemblies which contain a scissionable alignment allowing them to cut/trim vegetation that intersect the path of said alignment. The first cleaver assembly 20 and the second cleaver assembly 26 are provided as complementary components whose engagement results in the cutting or trimming of vegetation found positioned within the path of their alignment.

Figure 7:
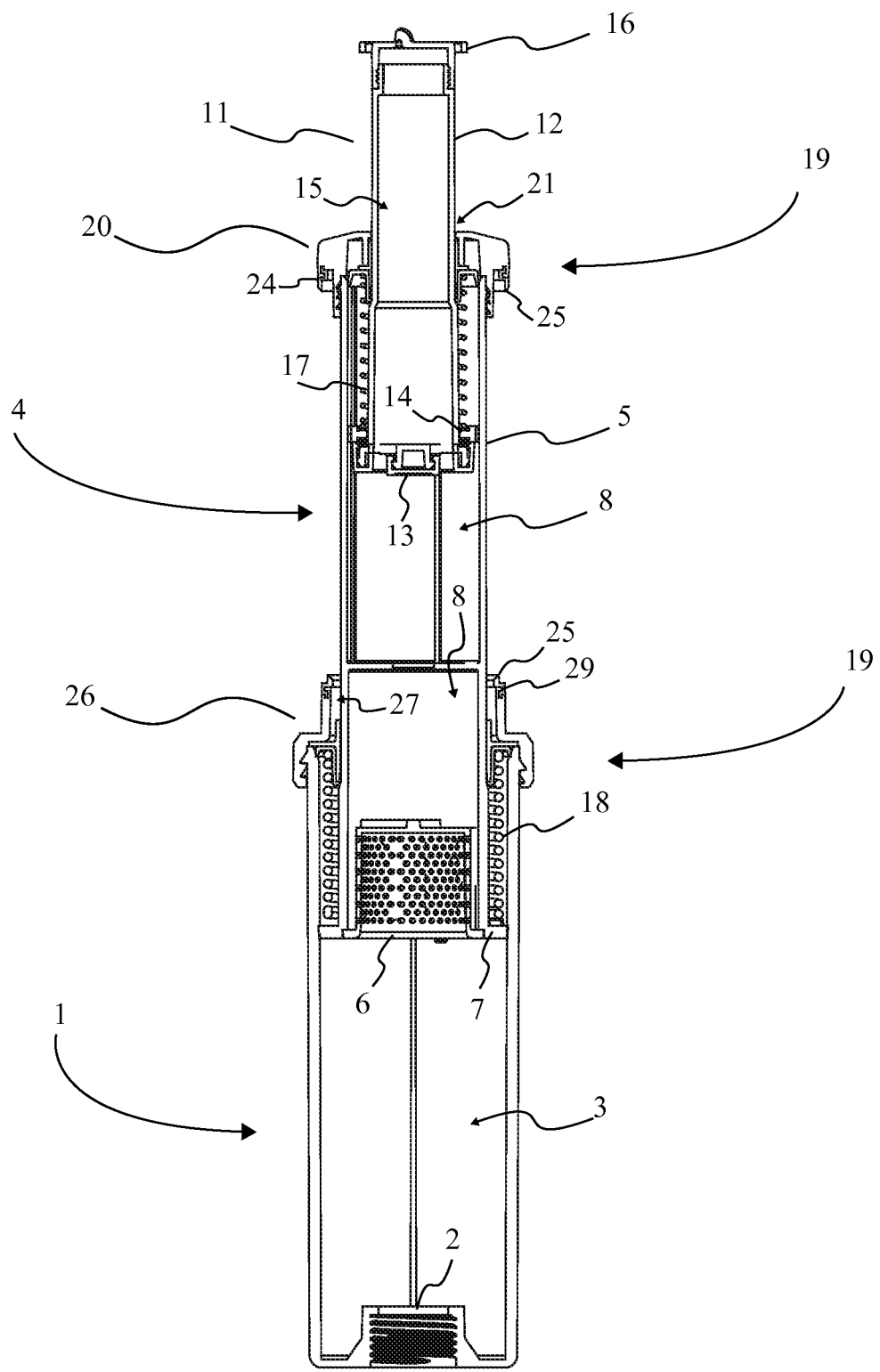
FIG. 7 is a sectional view displaying the positioning of the piston assembly, the main body, and the trimming mechanism in the telescoping/extended phase of the extending configuration of the present invention.
Figure 11:
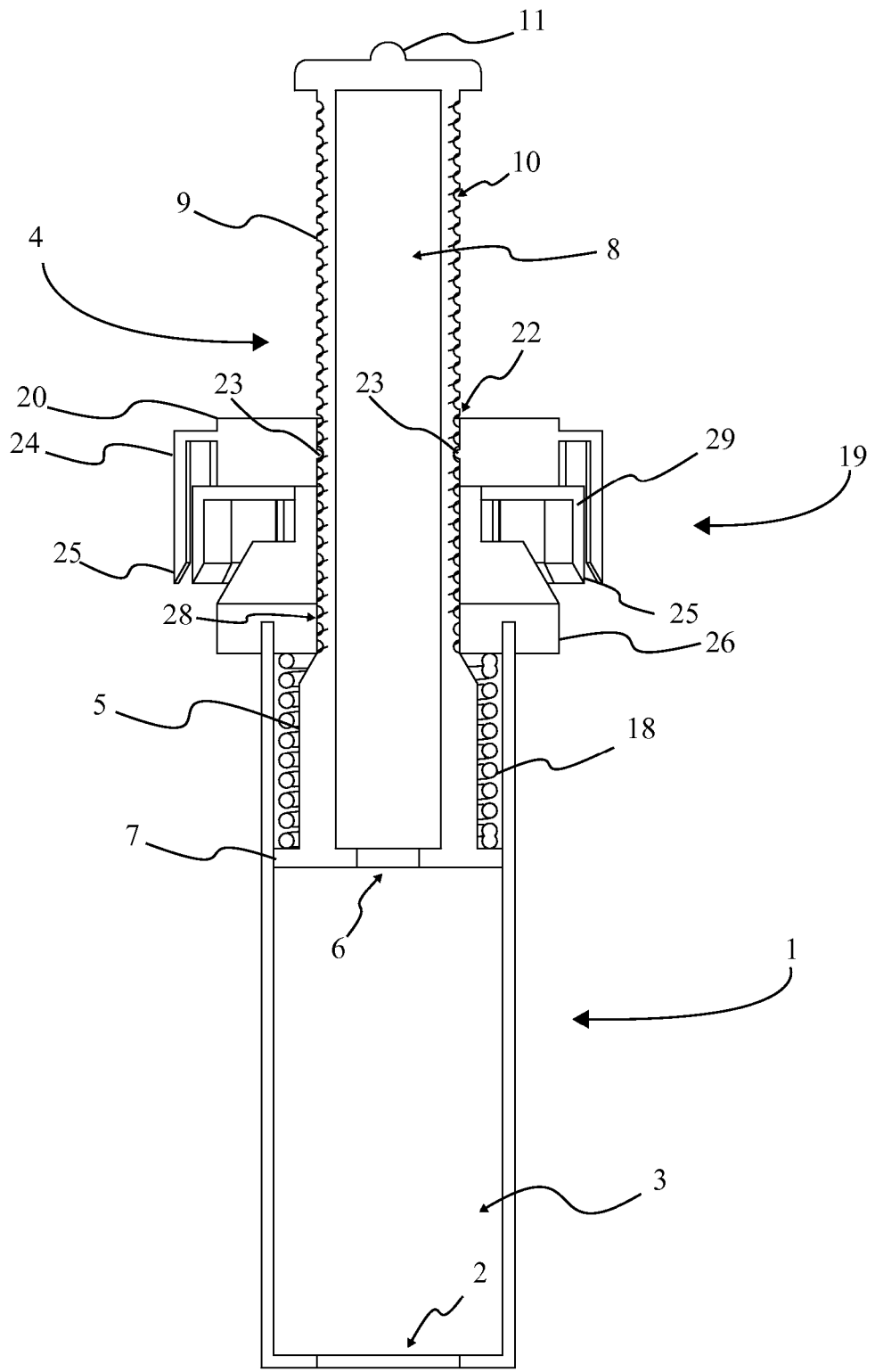
FIG. 11 is a sectional view displaying the positioning of the piston assembly, the main body, and the trimming mechanism in the telescoping/extended phase of the rotating configuration of the present invention.

Referencing FIG. 7 and FIG. 11, the piston assembly 4 functions as the telescoping/extendable component that is operatively activated by the pressurized fluid received by the main body 1. The piston assembly 4 is extendably positioned within the main fluid chamber 3. The piston assembly 4 traverses the first cleaver assembly 20 and the second cleaver assembly 26 of the trimming mechanism 19. The piston assembly 4 comprises a primary piston 5, a nozzle assembly 11, and a main spring 18. The primary piston 5 functions as a tubular body that protrudes from the main body 1 when activated by pressurized fluid. The nozzle assembly 11 is the fluid distribution element that is provided in a manner that directs and distributes fluid by limiting the flow rate of the fluid being extruded. The main spring 18 is the elastic retainer that allows the primary piston 5 to return to its resting position inside main fluid chamber 3 when fluid pressure decreases or is turned off. The main spring 18 is provided with an elasticity that is less than or equal to the force of common pressurized fluid sources. The primary piston 5 is sleeved by the main spring 18, wherein the main spring 18 is positioned circumferentially around the tubular body of the primary piston 5. The primary piston 5 is elastically coupled to the trimming mechanism 19 by way of the main spring 18. The primary piston 5 is found in fluid communication with the nozzle assembly 11.

The present invention is provided in two configurations that are functionally equivalent and contain similar relational positioning of main components but have a variation in the manner in which the trimming mechanism 19 functions. The first configuration, hereinafter referred to as the extending configuration, cleaves/severs vegetation that intersects an alignment between the first cleaver assembly 20 and the second cleaver assembly 26 created by the extendable/retractable coupling between the first cleaver assembly 20 and second cleaver assembly 26. The second configuration, hereinafter referred to as the rotating configuration, cut/trims vegetation that is proximally positioned to the rotation alignment between the first cleaver assembly 20 and the second cleaver assembly 26.

Figure 1:
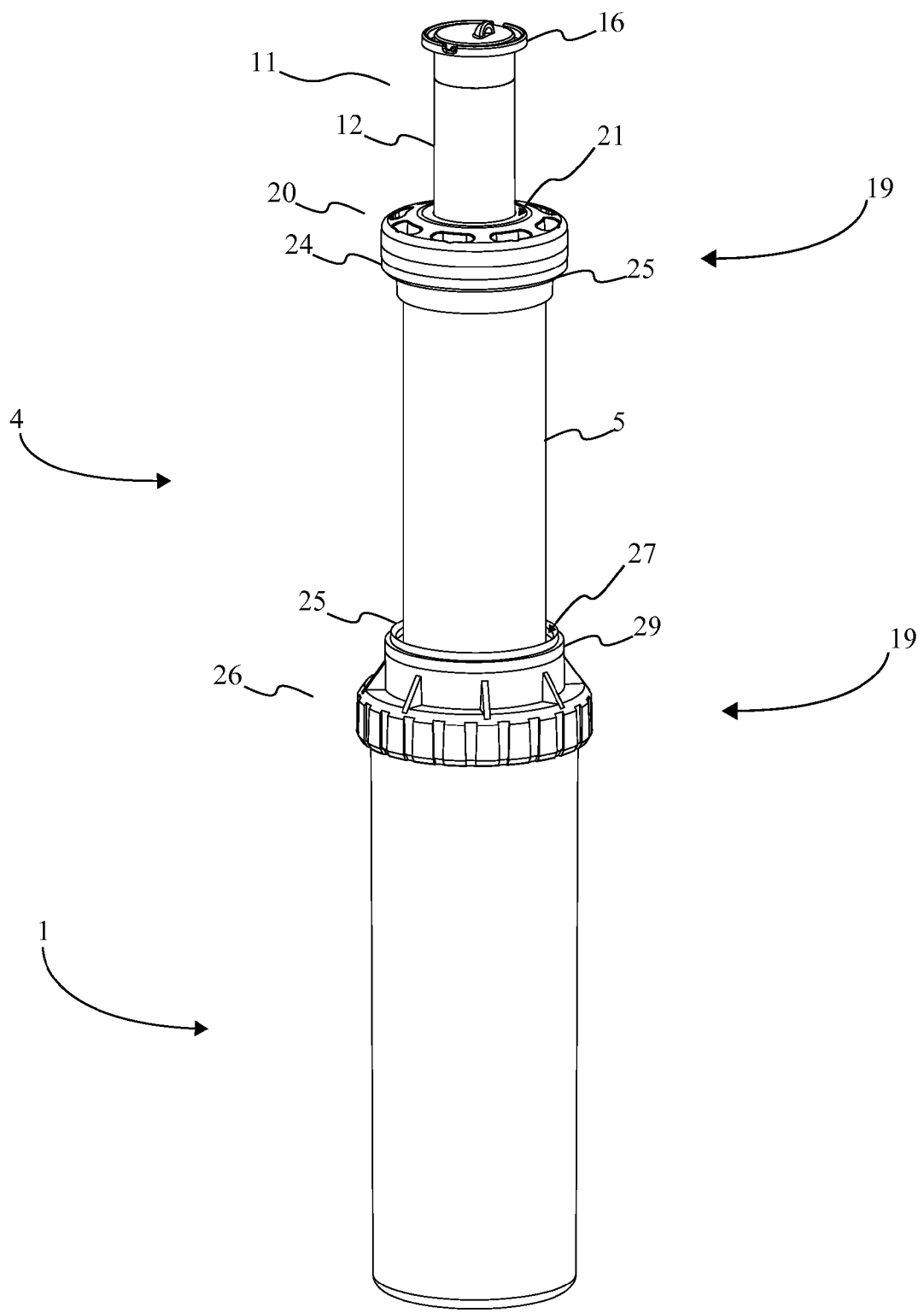
FIG. 1 is a frontal perspective view displaying the positioning of the piston assembly, the main body, and the trimming mechanism in the telescoping/extended phase of the extending configuration of the present invention.

Referencing FIG. 1 and FIG. 7, in the extending configuration of the present invention, the second cleaver assembly 26 and the first cleaver assembly 20 function as a complementary pair of assemblies which through their scissionable alignment are able to cut/trim vegetation that intersect the path of said alignment. The second cleaver mount 29 additionally functions as a means to separate and direct vegetation in its path of ascension. The second cleaver assembly 26 is found mounted to the main body 1, wherein the second cleaver assembly 26 is used to the cap the main fluid chamber 3. The first cleaver assembly 20 is found coupled to the piston assembly 4, wherein the coupling of the first cleaver assembly 20 to the piston assembly 4 provides the first cleaver assembly 20 with the means to extend away from the second cleaver assembly 26. The second cleaver assembly 26 is found being retractably traversed by the piston assembly 4, wherein the piston assembly 4 extends outwardly during activation by a pressurized fluid source and then returns to a resting state when the pressurized fluid source is deactivated. Resultantly, the first cleaver assembly 20 is found elastically retained to the second cleaver assembly 26, wherein the retained position of the first cleaver assembly 20 and the second cleaver assembly 26 is over come by the interaction of the pressurized fluid with the piston assembly 4. The second cleaver assembly 26 comprises a second cleaver mount 29 and a piston assembly shaft 27. The first cleaver assembly 20 comprises a first cleaver mount 24 and a nozzle assembly shaft 21. The piston assembly shaft 27 functions as the opening that allows the piston assembly 4 to be extended out from the main fluid chamber 3. The piston assembly shaft 27 traverses through the second cleaver assembly 26 and into the main fluid chamber 3. The piston assembly shaft 27 is positioned concentric to the second cleaver mount 29. The second cleaver mount 29 is the lower engagement point for the first cleaver assembly 20. The second cleaver mount 29 is found positioned opposite the main fluid chamber 3, wherein the orientation of the second cleaver mount 29 is facing upwardly in the direction of the first cleaver assembly 20. The first cleaver mount 24 is scissionably aligned with the second cleaver mount 29. The nozzle assembly shaft 21 is found positioned concentric to the first cleaver mount 24.

Figure 3:
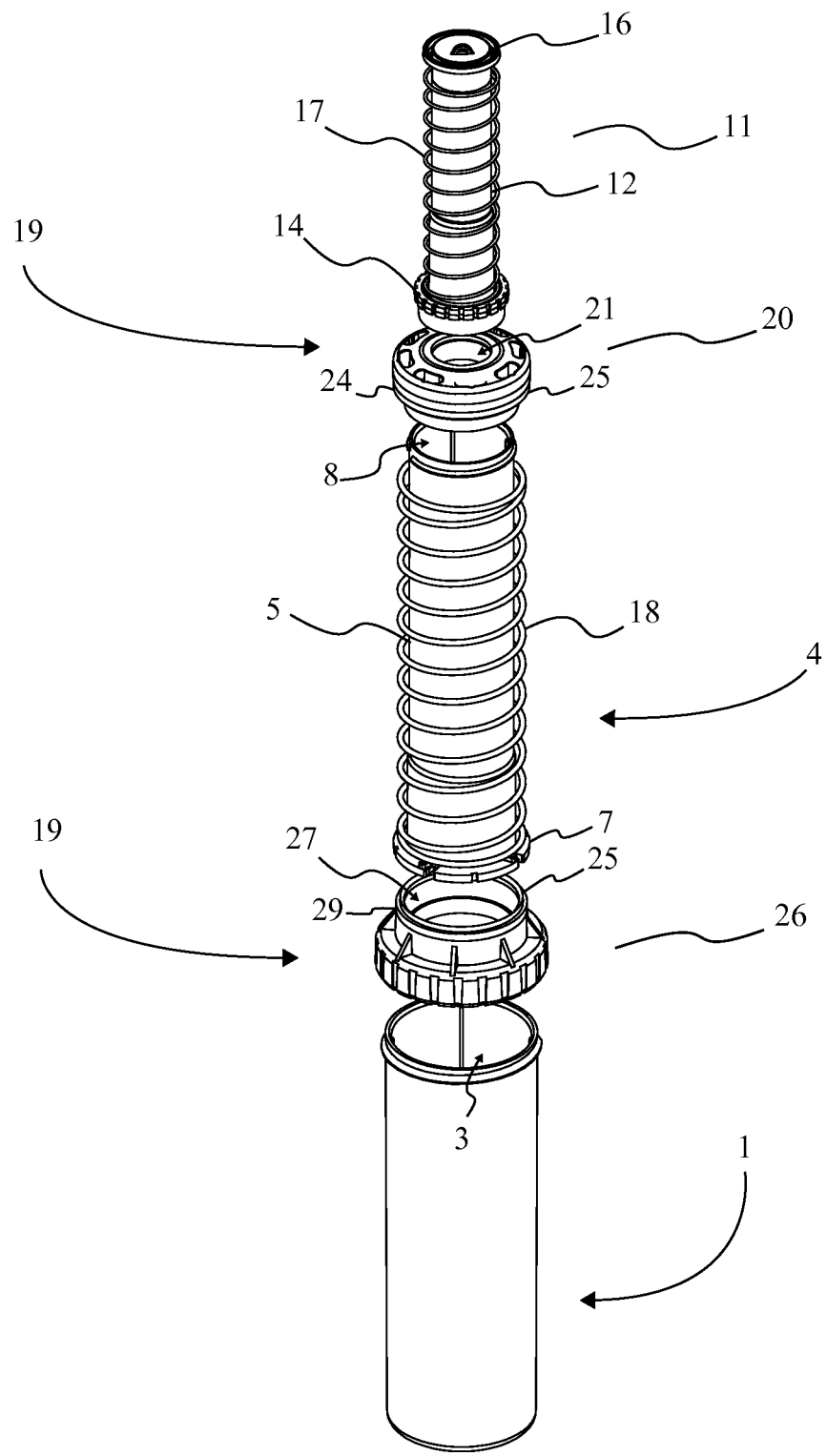
FIG. 3 is an expanded top elevational perspective view displaying the upper sections of the piston assembly, the main body, the trimming mechanism of the extending configuration of the present invention.
Figure 4:
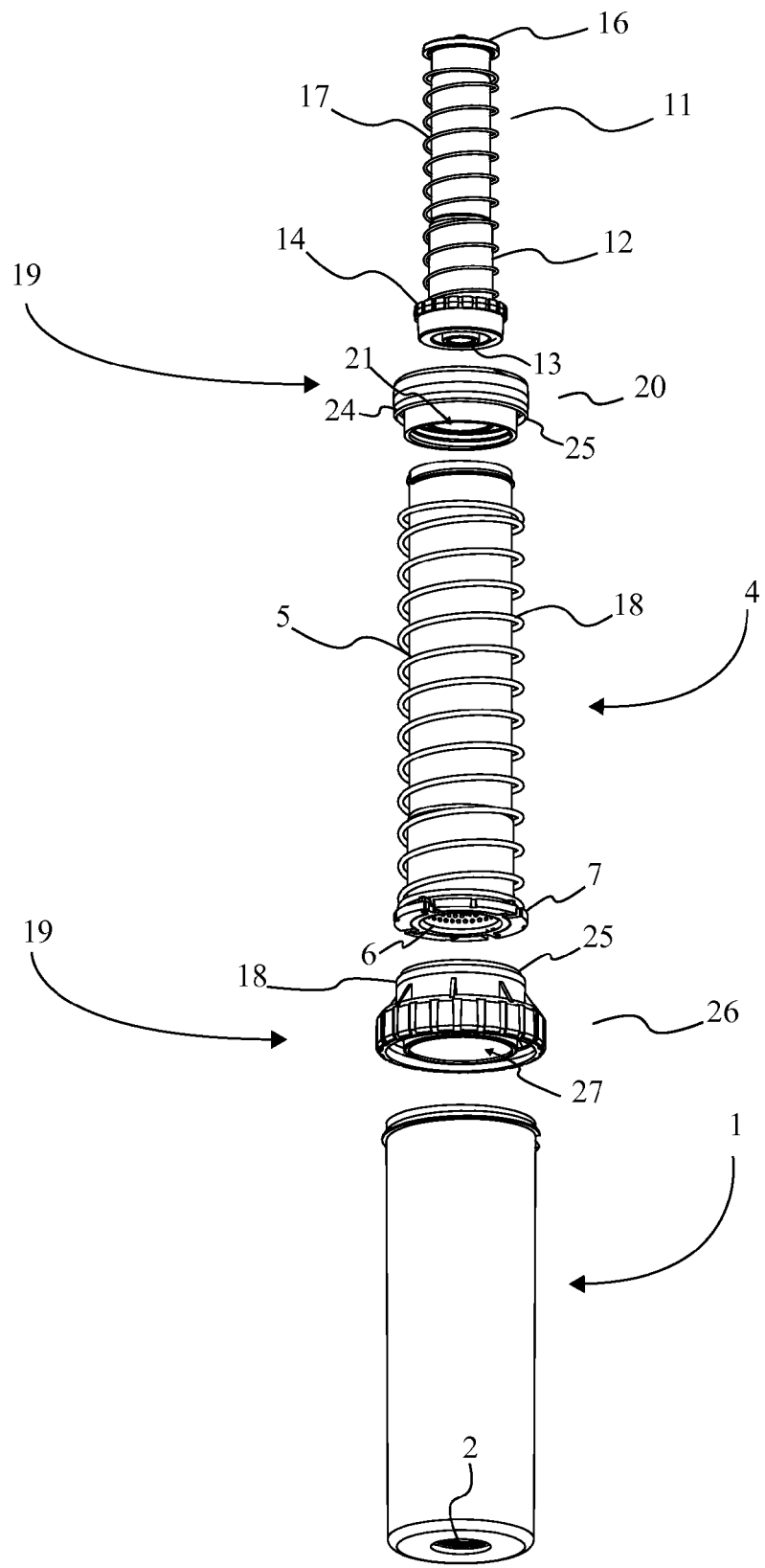
FIG. 4 is an expanded bottom elevational perspective view displaying the lower sections of the piston assembly, the main body, and the trimming mechanism of the extending of the present invention.
Figure 5:
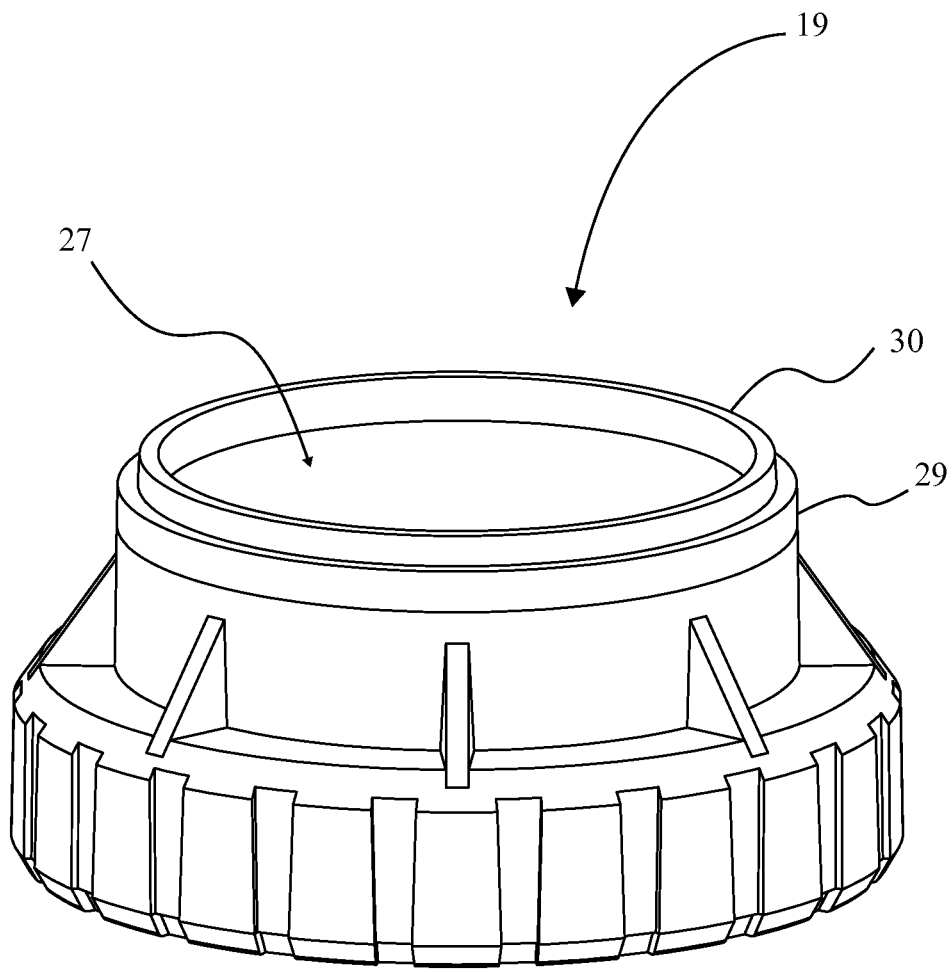
FIG. 5 is a frontal perspective view of the second cleaver assembly displaying the positioning of the intersecting cutting surface as per the current embodiment of the present invention.

Referencing FIG. 3-5, in the extending configuration of the present invention, the second cleaver mount 29 and the first cleaver mount 24 are provided as complementary components whose engagement results in the cutting or trimming of vegetation found positioned within the path of their alignment. The first cleaver mount 24 comprises at least one cutting blade 25, while the second cleaver mount 29 is provided in two configurations. In the first configuration the second cleaver mount 29 comprises at least one cutting blade 25. In this configuration, the at least one cutting blade 25 of the second cleaver mount 29 and the at least one cutting blade 25 of the first cleaver mount 24 would be provided with a scissionable alignment, wherein the alignment of the at least one cutting blade 25 of the second cleaver mount 29 to the at least one cutting blade 25 of the first cleaver mount 24 permits an incisable engagement. In the alternative configuration the second cleaver mount 29 would comprise an intersecting cutting surface 30. The positioning of the at least one cutting blade 25 of the first cleaver mount 24 and the intersecting cutting surface 30 would be provided with a scissionable alignment but would only require a single bladed surface to accomplish the same functionality. It should be noted that the cutting blade 25 for either the first cleaver mount 24 or the second cleaver mount 29 could utilizes a plurality of blade types and blade materials and it should therefore be considered an obvious difference to use straight edged blades, serrated blades, as well as any combination thereof in order to cut or sever vegetation found intersecting the alignment between the first cleaver mount 24 and the second cleaver mount 29. Furthermore it should be noted that references to the at least one cutting blade 25 is hereinafter referred to as the cutting blade 25 unless otherwise specified.

Referencing FIG. 1 and FIG. 7, in the extending configuration of the present invention, the primary piston 5 extendably traverses the second cleaver assembly 26 by way of the piston assembly shaft 27. The primary piston 5 is retractably coupled to the second cleaver assembly 26 by way of the main spring 18. The primary piston 5 is capped by the first cleaver assembly 20. The nozzle assembly 11 is found in fluid communication with the primary piston 5. The nozzle assembly 11 is positioned adjacent to the nozzle assembly shaft 21 of the first cleaver assembly 20. The primary piston 5 comprises a first fluid inlet 6, a primary fluid chamber 8, and a main spring flange 7. The first fluid inlet 6 is the fluid opening that permits pressurized fluids from the main fluid chamber 3 to enter the primary piston 5 on its way to the nozzle assembly 11. The primary fluid chamber 8 is the interior space of the primary piston 5 that is traversed into by the first fluid inlet 6. The main spring flange 7 is the engagement point between the main spring 18 and the primary piston 5. The first fluid inlet 6 is found concentrically positioned to the main spring flange 7. The primary fluid chamber 8 is positioned between the first fluid inlet 6 and the first cleaver assembly 20. The primary piston 5 is elastically coupled to the main spring 18 by way of the main spring flange 7.

Referencing FIG. 1-7, in the extending configuration of the present invention, the arrangement of the above mentioned and described components provides the present invention with the ability to function as a pop-up sprinkler that cut/trims herbaceous matter that interferes with the retractable motion of said pop-up sprinkler. The present invention accomplishes this by having the main body 1 coupled to a pressurized fluid source by way of the main fluid inlet 2. The main fluid inlet 2 would receive the pressurized fluid allowing the pressurized fluid to fill the main fluid chamber 3. In the main fluid chamber 3, the pressurized fluid would apply pressure to the primary piston 5. The fluid pressure felt by the primary piston 5 would be initially reduced by the fluid traversing through the first fluid inlet 6 and exiting the nozzle assembly 11 by way of the primary fluid chamber 8. Due to the intentional flow rate limitation of the nozzle assembly 11, fluid pressure would continue to rise within the main fluid chamber 3. The fluid pressure would be applied to the main spring 18 by way of the main spring flange 7 of the primary piston 5. The fluid pressure would compress the main spring 18 resulting in the movement of the primary piston 5 through the piston assembly shaft 27 of the second cleaver assembly 26. The movement of the primary piston 5 through the piston assembly shaft 27 would cause the first cleaver assembly 20 to disengage and ascend away from the second cleaver assembly 26, until the primary piston 5 is fully extended or the resistance of the main spring 18 is equivalent to the fluid pressure. During the extension of the primary piston 5, the second cleaver mount 29 would push/displace any vegetation or herbaceous material that may have grown over the first cleaver assembly 20. After pushing the vegetation aside, the first cleaver assembly 20 would then allow the vegetation or herbaceous material to return to its previous position, wherein the previous position would be below the first cleaver assembly 20. With the primary piston 5 fully extended, the first cleaver mount 24 and the second cleaver mount 29 would be disengaged but would retain their scissionable alignment, wherein said alignment is able to cut/trim vegetation that intersects the path of said alignment. Upon deactivation of the fluid pressure source, pressure applied to the main spring 18 would become less than the resistance of the main spring 18, resulting in the main spring 18 returning to its rest position according to the reference frame of the system. The primary piston 5 would retract into the main fluid chamber 3 causing the first cleaver assembly 20 to descend towards the second cleaver assembly 26. Vegetation or herbaceous matter found within the path of the scissionable alignment between the second cleaver mount 29 and the first cleaver mount 24 are cut or severed upon engagement of the first cleaver mount 24 and the second cleaver mount 29.

Referencing FIG. 1, in the extending configuration of the present invention, the nozzle assembly 11 can additionally function as an extension of the piston assembly 4, wherein the nozzle assembly 11 further extends the height of at which fluid is distributed. The nozzle assembly 11 is the extendable/retractable component that is found extendably positioned within the primary fluid chamber 8 of the primary piston 5. The nozzle assembly 11 retractably traverses the first cleaver assembly 20. The nozzle assembly 11 comprises a secondary piston 12, a nozzle 16, and a piston spring 17. The secondary piston 12 functions as a tubular body that protrudes from the primary piston 5 when activated by fluid pressure. The secondary piston 12 is utilized to extend the height of the nozzle assembly 11 allowing fluids to be extruded and distributed above the height of single piston assembly 4 sprinkler. The nozzle 16 is the fluid distribution element that directs and distributes fluids. The piston spring 17 is the elastic retainer that holds the secondary piston 12 within the primary fluid chamber 8. The piston spring's 17 elasticity is less than or equal to the force of common pressurized fluid sources. The secondary piston 12 is capped by the nozzle 16. The nozzle 16 is found in fluid communication with the secondary piston 12. The secondary piston 12 is sleeved by the piston spring 17, wherein the piston spring 17 is positioned circumferentially around the body of the secondary piston 12. The secondary piston 12 extendably traverses through the first cleaver assembly 20 by way of the nozzle assembly shaft 21. The secondary piston 12 is retractably coupled to the first cleaver assembly 20 by way of the piston spring 17.

Referencing FIG. 1 and FIG. 7, in the extending configuration of the present invention, the secondary piston 12 comprises a second fluid inlet 13, a secondary fluid chamber 15, and a piston spring flange 14. The second fluid inlet 13 is the fluid opening that permits pressurized fluid from the primary fluid chamber 8 to enter the secondary piston 12 on its way to the nozzle 16. The secondary fluid chamber 15 is the interior space within the secondary piston 12 that is traversed into by the second fluid inlet 13. The piston spring flange 14 is the engagement point between the piston spring 17 and the first cleaver assembly 20. The second fluid inlet 13 is found concentrically positioned to the piston spring flange 14. The secondary fluid chamber 15 is found positioned between the nozzle 16 and the second fluid inlet 13. The secondary piston 12 is elastically coupled to the piston spring 17 by way of the piston spring flange 14.

Referencing FIG. 1 and FIG. 7, in the extending configuration of the present invention, the inclusion of the secondary piston 12, the piston spring 17, and the nozzle 16, to the arrangement of the various components the system would function in the same manner as previously described but with additional interactions within the primary fluid chamber 8. In the primary fluid chamber 8, the pressurized fluid would apply pressure to the secondary piston 12. The fluid pressure felt by the secondary piston 12 would be initially reduced by the fluid traversing through the second fluid inlet 13 and exiting the nozzle 16 by way of the secondary fluid chamber 15. Fluid pressure would continue to rise within the primary fluid chamber 8. The fluid pressure would be applied to the piston spring 17 by way of the piston spring flange 14 of the secondary piston 12. The fluid pressure would compress the piston spring 17 resulting in the movement of the secondary piston 12 through the nozzle assembly shaft 21 of the first cleaver assembly 20. The movement of the secondary piston 12 through the nozzle assembly shaft 21 would cause the nozzle 16 to ascend above the first cleaver assembly 20 until the secondary piston 12 is fully extended or the resistance of the piston spring 17 is equivalent to the fluid pressure.

Figure 9:
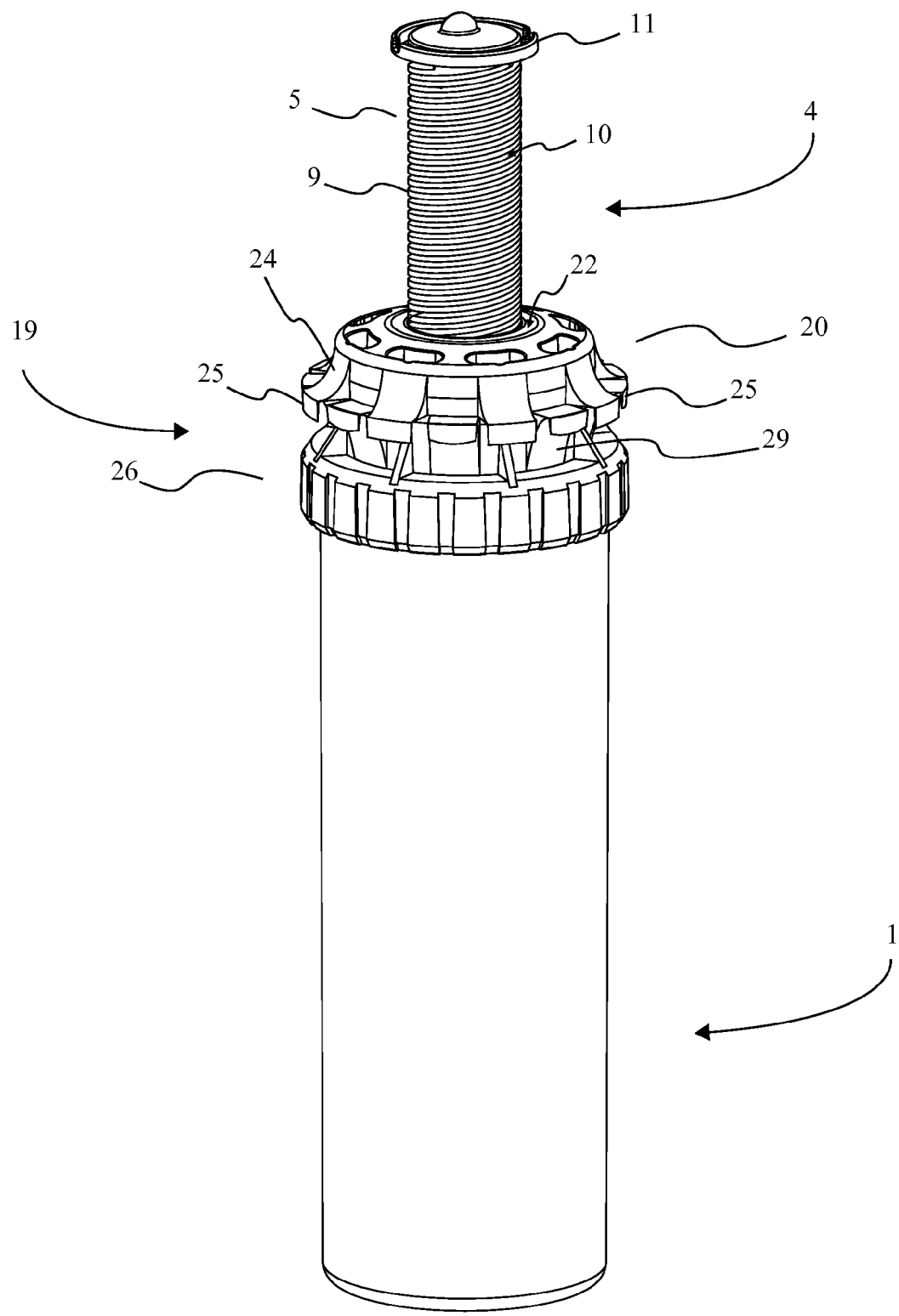
FIG. 9 is a frontal perspective view displaying the positioning of the piston assembly, the main body, and the trimming mechanism in the collapsed/retracted phase of the rotating configuration of the present invention.

Referencing FIG. 8 and FIG. 9, in the rotating configuration of the present invention, the second cleaver assembly 26 and the first cleaver assembly 20 function as a complementary pair of assemblies through which their scissionable alignment is able to cut/trim vegetation that intersect the path of said alignment. The second cleaver assembly 26 is found mounted to the main body 1, wherein the second cleaver assembly 26 is used to the cap the main fluid chamber 3. The first cleaver assembly 20 is found coupled rotatably to the second cleaver assembly 26, wherein the second cleaver assembly 26 is static in relation to rotational motion of the first cleaver assembly 20. Both the first cleaver assembly 20 and the second cleaver assembly 26 are traversed by the piston assembly 4 which extends outwardly during activation by a pressurized fluid source and then returns to a resting state when the pressurized fluid source is deactivated. The first cleaver assembly 20 is found rotationally engaged with the piston assembly 4, wherein the relation between the piston assembly 4 functions as a cam shaft and the extendable/retractable motion of the piston assembly 4 results in the rotational motion of first cleaver assembly 20. The first cleaver assembly 20 comprises a first cleaver mount 24 and a first piston assembly shaft 22. The second cleaver assembly 26 comprises a second cleaver mount 29 and a second piston assembly shaft 28. The first piston assembly shaft 22 and the second piston assembly shaft 28 are found positioned collinear to each other, wherein the collinear alignment between the first piston assembly shaft 22 and the second piston assembly shaft 28 allows the piston assembly 4 to traverse the trimming mechanism 19 during the extending and retracting phases of its operation. The first piston assembly shaft 22 is positioned concentrically to the first cleaver mount 24. The second piston assembly shaft 28 is positioned concentrically to the second cleaver mount 29. The first cleaver mount 24 being positioned laterally on the first cleaver assembly 20. The second cleaver mount 29 being positioned laterally on the second cleaver assembly 26. The first cleaver mount 24 is scissionably aligned with the second cleaver mount 29. The first piston assembly shaft 22 comprises a plurality of guide mounts 23. The plurality of guide mounts 23 are found radially positioned on the first piston assembly shaft 22. The plurality of guide mounts 23 are provided as the engagement method between the first cleaver assembly 20 and the piston assembly 4, wherein the plurality of guide mounts 23 allows the rotation of the first cleaver assembly 20 during the extending and retracting phases of the piston assembly 4's operation.

Referencing FIG. 9, in the rotating configuration of the present invention, the second cleaver mount 29 and the first cleaver mount 24 are provided as complementary components whose scissionable alignment results in the cutting or trimming of vegetation found positioned proximal to the trimming mechanism 19. Both the first cleaver mount 24 and the second cleaver mount 29 each comprise at least one cutting blade 25. It should be noted that references to the at least one cutting blade 25 is hereinafter referred to as the cutting blades 25 unless otherwise specified. The cutting blades 25 of the first cleaver mount 24 are provided with a co-radial alignment, wherein a cutting blade 25 of the first cleaver mount 24 are positioned co-radial with another cutting blade 25 of the first cleaver mount 24 creating a circular pattern of alignment on the lateral surface of the first cleaver assembly 20 the cutting blades 25 of the second cleaver mount 29 are provided with a co-radial alignment, wherein a cutting blade 25 of the second cleaver mount 29 are positioned co-radial with another cutting blade 25 of the second cleaver mount 29 creating a circular pattern of alignment on the lateral surface of the second cleaver assembly 26. The cutting blades 25 of the second cleaver mount 29 are provided with a scissionable alignment to the cutting blades 25 of the first cleaver mount 24, that during the rotation of the first cleaver assembly 20, the cutting blades 25 of the first cleaver mount 24 are able to cut/sever proximally positioned vegetation that intersect said alignment with the cutting blades 25 of the second cleaver assembly 26. It should be noted that the cutting blades 25 for either the first cleaver mount 24 or the second cleaver mount 29 could utilizes a plurality of blade types and blade materials and it should therefore be considered an obvious difference to use straight edged blades, serrated blades, as well as any combination thereof in order to cut or sever vegetation found intersecting the alignment between the first cleaver mount 24 and the second cleaver mount 29.

In the rotating configuration of the present invention, the primary piston 5 extendably traverses the trimming mechanism 19 by way of the second piston assembly shaft 28 and the first piston assembly shaft 22. The primary piston 5 is capped by the nozzle assembly 11. The primary piston 5 is rotatably coupled to the first cleaver assembly 20 by way of the plurality of guide mounts 23, wherein during the extending and retracting phases of the primary piston's 5 operation, the first cleaver assembly 20 rotates around the primary piston 5 while the primary piston 5 remains static to said rotation. The primary piston 5 is elastically coupled to the second cleaver assembly 26 by way of the main spring 18. The primary piston 5 is capped by the nozzle assembly 11. The nozzle assembly 11 is found in fluid communication with the primary piston 5. The nozzle assembly 11 is positioned adjacent to the first piston assembly shaft 22 opposite the second piston assembly shaft 28. The primary piston 5 comprises a first fluid inlet 6, a primary fluid chamber 8, a lateral wall 9, and a main spring flange 7. The first fluid inlet 6 is the fluid opening that permits pressurized fluids from the main fluid chamber 3 to enter the primary piston 5 on its way to the nozzle assembly 11. The primary fluid chamber 8 is the interior space of the primary piston 5 that is traversed into by the first fluid inlet 6. The main spring flange 7 is the engagement point between the main spring 18 and the primary piston 5. The lateral wall 9 is the contacting surface that engages the plurality of guide mounts 23 of the first piston assembly shaft 22. The first fluid inlet 6 is found concentrically positioned to the main spring flange 7. The primary fluid chamber 8 is positioned between the first fluid inlet 6 and the first cleaver assembly 20. The primary fluid chamber 8 is surrounded by the lateral wall 9. The primary piston 5 is elastically coupled to the main spring 18 by way of the main spring flange 7. The first fluid chamber is capped by the nozzle assembly 11. The lateral wall 9 comprises a plurality of guide channels 10. The plurality of guide channels 10 are provided as the mounting point for the plurality of guide mounts 23. The plurality of guide channels 10 are radially positioned extend longitudinally across the lateral wall 9.

Referencing FIG. 10 and FIG. 11, in the rotating configuration of the present invention, the arrangement of the above mentioned and described components provide the present invention with the ability to function as a pop-up sprinkler that trims herbaceous matter that proximally positioned to the location of said pop-up sprinkler. The present invention accomplishes this by having the main body 1 coupled to a pressurized fluid source by way of the main fluid inlet 2. The main fluid inlet 2 would receive the pressurized fluid allowing the pressurized fluid to fill the main fluid chamber 3. In the main fluid chamber 3, the pressurized fluid would apply pressure to the primary piston 5. The fluid pressure felt by the primary piston 5 would be initially reduced by having the fluid traversing through the first fluid inlet 6 and exiting through nozzle assembly 11 by way of the primary fluid chamber 8. Due to the intentional flow rate limitation of the nozzle assembly 11, fluid pressure would continue to rise within the main fluid chamber 3. The fluid pressure would be applied to the main spring 18 by way of the main spring flange 7 of the primary piston 5. The fluid pressure would compress the main spring 18 resulting in the movement of the primary piston 5 through the second piston assembly shaft 28 and the first piston assembly shaft 22. The movement of the primary piston 5 through the first piston assembly shaft 22 would cause the plurality of guide mounts 23 to traverse along the plurality of guide channels 10 of the lateral wall 9. The first cleaver assembly 20 would rotate on top of the second cleaver assembly 26 as the plurality of guide mounts 23 traverse along the plurality of guide channels 10, until the primary piston 5 is fully extended or the resistance of the main spring 18 is equivalent to the fluid pressure. During the extension of the primary piston 5, the cutting blades 25 of the second cleaver mount 29 and the cutting blades 25 of the first cleaver mount 24 would cleave/cut any vegetation or herbaceous material that may have grown within the alignment of the first cleaver mount 24 and the second cleaver mount 29. With the primary piston 5 fully extended, the first cleaver assembly 20 would remain stationary. Upon deactivation of the fluid pressure source, pressure applied to the main spring 18 would become less than the resistance of the main spring 18, resulting in the main spring 18 returning to its rest position according to the reference frame of the system. The primary piston 5 would retract into the main fluid chamber 3 causing the plurality of guide mounts 23 to traverse along the plurality of guide channels 10 in the reverse direction of the extending phase. The first cleaver assembly 20 begins to rotate around the primary piston 5. The cutting blades 25 of the first cleaver mount 24 and the cutting blade 25 of the second cleaver mounts 29 then cleave/trim any vegetation or herbaceous material that was not cleaved/trimmed during the extension phase of the primary piston 5.

In the current embodiment of the present invention the main fluid inlet 2, the lower cleaver assembly, the upper cleaver assembly, and the nozzle 16 are detachably coupled to their respective components. While the present invention does not describe the exact connection method utilized by the components, it should be understood as an obvious conclusion that any fastening method that permits component to couple and decouple could potentially be utilized.

Although the invention has been explained in relation to its preferred embodiment, it is to be understood that many other possible modifications and variations can be made without departing from the spirit and scope of the invention as hereinafter claimed.

What is claimed is:

1. A self trimming pop-up sprinkler head for use in removing vegetative obstructions comprises,
    a main body;
    a piston assembly;
    a trimming mechanism;
    the main body comprises a main fluid inlet and a main fluid chamber;
    the piston assembly comprises a primary piston, a nozzle assembly, and a main spring;
    the trimming mechanism comprises a first cleaver assembly and a second cleaver assembly;
    the first cleaver assembly comprises a first cleaver mount;
    the second cleaver assembly comprises a second cleaver mount;
    the main body being in fluid communication with the piston assembly;
    the piston assembly being extendably positioned within the main body;
    the main body being capped by the trimming mechanism;
    the trimming mechanism being traversed by the piston assembly;
    the main fluid inlet traversing into the main fluid chamber;
    the primary piston being sleeved by the main spring; and
    the primary piston being in fluid communication with the nozzle assembly;
    the second cleaver assembly comprises a piston assembly shaft;
    the second cleaver assembly being traversed by the piston assembly; and
    the first cleaver assembly being elastically retained against the second cleaver assembly;
    the second cleaver mount being positioned opposite the main fluid chamber;

the first cleaver mount being elastically retained to the second cleaver mount; and the first cleaver mount and the second cleaver mount each comprise at least one cutting blade; and the at least one cutting blade of the first cleaver mount being scissionably aligned with the at least one cutting blade of the second cleaver mount, wherein the alignment of the cutting blade of the second cleaver mount to the cutting blade of the first cleaver mount permits an incisable engagement.

2. The self trimming pop-up sprinkler head for use in removing vegetative obstructions as claimed in claim 1 comprises, the main fluid chamber being capped by the trimming mechanism;

the primary piston being extendably positioned within the main fluid chamber; and the primary piston being elastically coupled to the trimming mechanism by way of the main spring.

3. The self trimming pop-up sprinkler head for use in removing vegetative obstructions as claimed in claim 1 comprises, the first cleaver assembly being scissionably aligned with the second cleaver assembly, wherein the alignment between the second cleaver assembly and the first cleaver assembly is provided for cutting or severing of herbaceous material within the alignment.

4. The self trimming pop-up sprinkler head for use in removing vegetative obstructions as claimed in claim 1 comprises, the primary piston comprises a first fluid inlet, a main spring flange, and a primary fluid chamber; and the first cleaver assembly comprises a nozzle assembly shaft.

5. The self trimming pop-up sprinkler head for use in removing vegetative obstructions as claimed in claim 4 comprise, the primary piston being capped by the first cleaver assembly;

the primary piston being retractably coupled to the second cleaver assembly by way of the main spring;

the piston assembly shaft being traversed by the primary piston; and the nozzle assembly being positioned adjacent to the nozzle assembly shaft.

6. The self trimming pop-up sprinkler head for use in removing vegetative obstructions as claimed in claim 5 comprises, the first cleaver mount comprises at least one cutting blade;

the second cleaver mount comprises an intersecting cutting surface; and the at least one cutting blade being scissionably aligned with the intersecting cutting surface, wherein the alignment between the cutting blade and the intersecting cutting surface permits an incisable engagement.

7. The self trimming pop-up sprinkler head for use in removing vegetative obstructions as claimed in claim 4 comprise, the first cleaver assembly being positioned adjacent to the primary fluid chamber opposite the first fluid inlet;

the first fluid inlet being positioned concentrically to the main spring flange;

the first fluid inlet traversing into the primary fluid chamber;

the main spring being coupled to the main spring flange;

the main fluid chamber being in fluid communication with the primary fluid chamber by way of the first fluid inlet; and the nozzle assembly shaft being concentrically positioned to the first cleaver mount.

8. The self trimming pop-up sprinkler head for use in removing vegetative obstructions as claimed in claim 4 comprise, the nozzle assembly comprises a secondary piston, a nozzle, and a piston spring;

the secondary piston comprises a second fluid inlet, a piston spring flange, and a secondary fluid chamber;

the nozzle assembly being extendably positioned within the first fluid chamber; and the first cleaver assembly being traversed by the nozzle assembly.

9. The self trimming pop-up sprinkler head for use in removing vegetative obstructions as claimed in claim 8 comprise, the secondary piston being sleeved by the piston spring;

the secondary piston being retractably coupled to the first cleaver assembly by way of the piston spring;

the nozzle assembly shaft being traversed by the secondary piston; and the secondary piston being capped by the nozzle.

10. The self trimming pop-up sprinkler head for use in removing vegetative obstructions as claimed in claim 8 comprise, the second fluid inlet traversing into the secondary fluid chamber;

the second fluid inlet being concentrically positioned to the piston spring flange;

the piston spring being coupled to the piston spring flange; and the primary fluid chamber being in fluid communication with the nozzle by way of the second fluid inlet and the secondary fluid chamber.

11. A self trimming pop-up sprinkler head for use in removing vegetative obstructions comprises, a main body; a piston assembly; a trimming mechanism; the main body comprises a main fluid inlet and a main fluid chamber; the piston assembly comprises a primary piston, a nozzle assembly, and a main spring; the trimming mechanism comprises an first cleaver assembly and a second cleaver assembly; the first cleaver assembly comprises a first cleaver mount; the second cleaver assembly comprises a second cleaver mount; the main body being in fluid communication with the piston assembly; the piston assembly being extendably positioned within the main body; the main body being capped by the trimming mechanism; the trimming assembly being traversed by the piston assembly; the main fluid inlet traversing into the main fluid chamber; the primary piston being sleeved by the main spring; and the primary piston being in fluid communication with the nozzle assembly; the primary piston comprises a first fluid inlet, a main spring flange, a primary fluid chamber, and a lateral wall the first cleaver assembly comprises a first piston assembly shaft; the second cleaver assembly comprises a second piston assembly shaft; the lateral wall comprises a plurality of guide channels; the first piston assembly shaft comprises a plurality of a guide mounts; and the first cleaver mount and the second cleaver mount each comprise at least one cutting blade.

12. The self trimming pop-up sprinkler head for use in removing vegetative obstructions as claimed in claim 11 comprises, the main fluid chamber being capped by the trimming mechanism;

the primary piston being extendably positioned within the main fluid chamber; and the primary piston being elastically coupled to the trimming mechanism by way of the main spring.

13. The self trimming pop-up sprinkler head for use in removing vegetative obstructions as claimed in claim 11 comprises, the first cleaver assembly being scissionably aligned with the second cleaver assembly, wherein the alignment between the second cleaver assembly and the first cleaver assembly is provided for cutting or severing of herbaceous material within the alignment.

14. The self trimming pop-up sprinkler head for use in removing vegetative obstructions as claimed in claim 11 comprises, the primary fluid chamber being surrounded by the lateral wall;

the first fluid inlet traversing into the primary fluid chamber;

the nozzle assembly being positioned adjacent to the first piston assembly shaft, opposite the second piston assembly shaft;

the primary piston being capped by the nozzle assembly;

the first fluid inlet being positioned concentrically to the main spring flange;

the lateral wall being positioned between the main spring flange and the nozzle assembly;

the plurality of guide channels being radially positioned along the lateral wall;

the plurality of guide channels being longitudinally positioned across the lateral wall;

the plurality of guide mounts being radially positioned around the first piston assembly shaft;

the first cleaver mount being positioned laterally on the first cleaver assembly;

the second cleaver mount being positioned laterally on the second cleaver assembly;

the at least one cutting blade of the first cleaver mount being co-radial with another at least one cutting blade of the first cleaver mount; and the at least one cutting blade of the second cleaver mount being co-radial with another at least one cutting blade of the second cleaver mount.

15. The self trimming pop-up sprinkler head for use in removing vegetative obstructions as claimed in claim 11 comprises, the primary fluid chamber being capped by the nozzle assembly;

the first cleaver assembly being rotationally engaged with the lateral wall;

the first cleaver assembly being rotatably coupled to the second cleaver assembly;

the second piston assembly shaft being collinearly with the first piston assembly shaft;

the main fluid chamber being in fluid communication with the primary fluid chamber by way of the first fluid inlet; and the second cleaver assembly being static to the first cleaver assembly.

16. The self trimming pop-up sprinkler head for use in removing vegetative obstructions as claimed in claim 11 comprises, the main spring being coupled to the main spring flange;

the primary piston traversing the second piston assembly shaft;

the primary piston traversing the first piston assembly shaft;

the second cleaver mount being concentrically positioned to the first cleaver mount;

the plurality of guide mounts traversing along the plurality of guides channels;

the plurality of guide mounts being rotatably engaged to the plurality of guide channels; and the second cleaver mount being positioned static to the first cleaver mount.

\* \* \* \* \*